United States Patent
Ohno et al.

(10) Patent No.: US 9,453,952 B2
(45) Date of Patent: Sep. 27, 2016

(54) POLARIZING PLATE AND IMAGE DISPLAY DEVICE

(71) Applicant: FUJIFILM Corporation, Tokyo (JP)

(72) Inventors: Takahiro Ohno, Kanagawa (JP); Tatsuya Oba, Kanagawa (JP); Yoshitaka Maeda, Kanagawa (JP); Xiao Ling, Kanagawa (JP); Shun Inoue, Kanagawa (JP); Megumi Sekiguchi, Kanagawa (JP); Yohei Takahashi, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 14/753,513

(22) Filed: Jun. 29, 2015

(65) Prior Publication Data

US 2015/0378073 A1     Dec. 31, 2015

(30) Foreign Application Priority Data

Jun. 30, 2014  (JP) ................. 2014-135285

(51) Int. Cl.
    *G02B 5/30*     (2006.01)
    *G02F 1/1335*   (2006.01)

(52) U.S. Cl.
    CPC ................... *G02B 5/305* (2013.01)

(58) Field of Classification Search
    CPC ...... G02B 5/30; G02B 5/3033; G02B 5/305; G02F 1/133528
    See application file for complete search history.

(56) References Cited

U.S. PATENT DOCUMENTS

| | | | | |
|---|---|---|---|---|
| 3,914,018 A * | 10/1975 | DeShazer | ................ | G02B 1/08 359/489.09 |
| 7,622,055 B2 | 11/2009 | Nakano et al. | | |
| 2007/0052922 A1* | 3/2007 | King | ................ | G02B 5/23 351/159.41 |
| 2007/0231507 A1* | 10/2007 | Sugiyama | .................. | C08J 5/18 428/1.31 |
| 2009/0033833 A1* | 2/2009 | Aminaka | ............... | C09J 133/06 349/68 |
| 2009/0086126 A1* | 4/2009 | Ohgaru | .................. | G02B 1/105 349/96 |
| 2009/0103015 A1* | 4/2009 | Aminaka | ............... | G02B 1/105 349/96 |
| 2009/0237786 A1* | 9/2009 | Yoshihara | .............. | G02B 1/105 359/485.01 |
| 2010/0238383 A1* | 9/2010 | Nakano | ................ | G02B 5/3033 349/96 |
| 2011/0151145 A1* | 6/2011 | Kamohara | ................ | C08B 3/00 428/1.33 |
| 2012/0018685 A1* | 1/2012 | Sasada | ........................ | C08J 5/18 252/585 |
| 2012/0231217 A1* | 9/2012 | Sasada | ...................... | G02B 1/04 428/141 |
| 2012/0251739 A1* | 10/2012 | Kato | ......................... | G02B 1/04 428/1.33 |
| 2013/0120839 A1* | 5/2013 | Fukagawa | ............ | G02B 5/3025 359/483.01 |
| 2014/0098331 A1* | 4/2014 | Hisanaga | ............... | G02B 1/105 349/96 |
| 2014/0116618 A1* | 5/2014 | Nakata | ............. | B29C 66/83415 156/308.2 |
| 2014/0225499 A1* | 8/2014 | Ren | ........................ | G02B 27/26 313/504 |
| 2014/0254014 A1* | 9/2014 | Ishiguro | ............... | G02B 5/3083 359/489.07 |
| 2014/0300965 A1* | 10/2014 | Takeda | .................. | G02B 1/105 359/513 |
| 2014/0322554 A1* | 10/2014 | Arita | .................... | G02B 5/3083 428/522 |

FOREIGN PATENT DOCUMENTS

| | | | | |
|---|---|---|---|---|
| JP | 2007-334307 A | 12/2007 | | |
| JP | 2008-107432 A | 5/2008 | | |
| JP | 2011-221185 A | 11/2011 | | |
| JP | 2013-127058 | * | 6/2013 | ............... G02B 5/30 |

* cited by examiner

*Primary Examiner* — Frank Font (74) *Attorney, Agent, or Firm* — Jean C. Edwards, Esq.; Edwards Neils LLC (57) ABSTRACT

A polarizing plate includes an outer protective film and a polarizer. The sum S of the product of the modulus of elasticity and the cube of the thickness in each layer is up to 150,000 Pa·mm$^3$, and the value obtained by dividing the sum S by the Knoop hardness k of the outer protective film is 200 or more but up to 450. The polarizing plate is excellent in surface pencil hardness even when its thickness is reduced.

19 Claims, 2 Drawing Sheets

POLARIZING PLATE AND IMAGE DISPLAY DEVICE

CROSS-REFERENCE TO RELATED APPLICATIONS

The present application claims priority under 35 U.S.C. §119 to Japanese Patent Application No. 2014-135285, filed on Jun. 30, 2014. The above application is hereby expressly incorporated by reference, in its entirety, into the present application.

BACKGROUND OF THE INVENTION

The present invention relates to a polarizing plate and an image display device.

In recent years, liquid crystal display devices and particularly those for medium- and small-sized applications are decreasing in thickness and members to be used therefor (e.g., a polarizing plate) are correspondingly required to have reduced thicknesses.

Exemplary methods of reducing the thickness of a polarizing plate include a method in which the thickness of a polarizer itself or a protective film thereof is reduced, and a method in which a protective film to be disposed on the opposite side surface of a polarizer to a liquid crystal cell (outer protective film) and a protective film to be disposed between the polarizer and the liquid crystal cell (inner protective film) are not used.

To be more specific, JP 2007-334307 A describes, for such a thickness reduction method, a polarizing plate comprising a polarizer and a cured resin layer, wherein the cured resin layer is formed directly on at least one surface of the polarizer and the cured resin layer is one formed of a solventless photocurable composition comprising: an ingredient (A); an ingredient (B); and an ingredient (C) shown below:
(A) at least one of a polyfunctional acrylic monomer and a polyfunctional methacrylic monomer;
(B) a photocurable prepolymer; and
(C) a photopolymerization initiator (claim 1).

JP 2008-107432 A describes a polarizing plate in which an intervening layer formed of a thermosetting resin is directly stacked on at least one surface of a polarizer and a hard coat layer formed of a thermosetting or photocurable resin is directly stacked on the intervening layer (claim 1).

JP 2011-221185 A describes a polarizing plate comprising: a polarizer; and a cured resin layer, wherein the cured resin layer is formed directly on at least one surface of the polarizer and the cured resin layer is one formed of a curable resin composition comprising: an ingredient (A) and an ingredient (B) shown below:
(A) a polyfunctional (meth)acrylic monomer having three or more (meth)acryloyl groups in the molecule structure; and
(B) a monofunctional or difunctional (meth)acrylic monomer having at least one hydroxyl group and one or two (meth)acryloyl groups in the molecular structure (claim 1).

SUMMARY OF THE INVENTION

The inventors of the present invention have examined the polarizing plates described in JP 2007-334307 A, JP 2008-107432 A and JP 2011-221185 A, more specifically the polarizing plates in each of which the hard coat layer is disposed outside the polarizer (on the opposite side to the side on which a liquid crystal cell is to be disposed) without disposing a protective film and found that the pencil hardness on the polarizing plate surface may be insufficient.

Accordingly, an object of the present invention is to provide a polarizing plate which is excellent in surface pencil hardness even when its thickness is reduced. Another object of the invention is to provide an image display device using the polarizing plate.

The inventors of the present invention have made an intensive study in order to achieve the foregoing objects and as a result found that if the Knoop hardness of an outer protective film, and the sum of the product of the modulus of elasticity and the cube of the thickness in each of layers making up a polarizing plate satisfy a specific relation, it is possible to obtain a good pencil hardness on the polarizing plate surface even when the overall thickness of the polarizing plate is reduced, and thus achieved the present invention.

Accordingly, the inventors of the invention have found that the foregoing objects can be achieved by the characteristic features as described below.

[1] A polarizing plate comprising: an outer protective film; and a polarizer,
wherein a sum S of a product of a modulus of elasticity and a cube of a thickness in each layer is up to 150,000 Pa·mm³, and
wherein a value obtained by dividing the sum S by a Knoop hardness k of the outer protective film is 200 or more but up to 450.

[2] The polarizing plate according to [1], wherein the outer protective film has a thickness of 5 μm-30 μm.

[3] The polarizing plate according to [1] or [2], wherein the outer protective film has a modulus of elasticity of 2.0 GPa-4.0 GPa.

[4] The polarizing plate according to any one of [1] to [3], wherein the outer protective film has a Knoop hardness k of 150 N/mm²-300 N/mm².

[5] The polarizing plate according to any one of [1] to [4], wherein the polarizer has a thickness of 2 μm-18 μm.

[6] The polarizing plate according to any one of [1] to [5], wherein the polarizing plate comprises an inner hard coat layer with a thickness of up to 7 μm on a side of the polarizer opposite to a side on which the outer protective film is formed.

[7] The polarizing plate according to any one of [1] to [6], wherein the polarizing plate comprises an outer hard coat layer with a thickness of up to 7 μm on a side of the outer protective film opposite to a side on which the polarizer is formed.

[8] An image display device comprising the polarizing plate according to any one of [1] to [7].

The present invention can provide a polarizing plate which is excellent in surface pencil hardness even when its thickness is reduced, and an image display device using the polarizing plate.

DETAILED DESCRIPTION OF THE INVENTION

The present invention is described below in detail.

The configuration requirements to be described below may be explained based on typical embodiments according to the invention but the invention is not limited to such embodiments.

A numerical value range expressed using a hyphen (-) in the specification refers to a range including numerical values described before and after the hyphen as the lower limit and the upper limit, respectively.

[Polarizing Plate]

The polarizing plate of the invention is one including: an outer protective film; and a polarizer, wherein the sum S of the product of the modulus of elasticity and the cube of the thickness in each layer (hereinafter also referred to simply as "sum S") is up to 150,000 Pa·mm$^3$ and the value (S/k) obtained by dividing the sum S by the Knoop hardness k of the outer protective film is 200 or more but up to 450.

The "outer protective film" as used herein refers to a protective film provided on a side of the polarizer opposite to the side on which a liquid crystal cell or an organic EL display panel is to be provided when the polarizing plate of the invention is used as the polarizing plate of an image display device. As described above, each of the polarizing plates described in JP 2007-334307 A, JP 2008-107432 A and JP 2011-221185 A has a configuration using no outer protective film, but is provided with an optional protective film on a surface of the polarizer on which a liquid crystal cell or an organic EL display panel is to be provided (hereinafter this film is also referred to as "inner protective film").

The term "each layer" in the "sum S of the product of the modulus of elasticity and the cube of the thickness in each layer" refers to the outer protective film and the polarizer included in the polarizing plate of the invention as well as optional layers such as an inner hard coat layer, an outer hard coat layer and a pressure-sensitive adhesive layer. Therefore, the "sum S of the product of the modulus of elasticity and the cube of the thickness in each layer" is a parameter on the rigidity of the polarizing plate according to the invention.

According to the invention, a polarizing plate having at least an outer protective film and a polarizer can have a good pencil hardness on the polarizing plate surface even when the thickness is reduced if the sum S of the product of the modulus of elasticity and the cube of the thickness in each layer is up to 150,000 Pa·mm$^3$ and the value (S/k) obtained by dividing the sum S by the Knoop hardness k of the outer protective film is 200 or more but up to 450.

According to the invention, the polarizing plate preferably has a thickness of up to 90 µm, more preferably up to 70 µm, and even more preferably up to 65 µm.

The reason why a good pencil hardness is thus obtained on the polarizing plate surface is not clarified in detail but is presumed as follows:

That is, this is presumably because stress applied to the outer surface in the polarizing plate of the invention is dispersed to cause the whole of the polarizing plate to be moderately deformed and hence the polarizing plate can return to the original state after the applied stress is removed. In other words, this is presumably because the outer protective film has a good balance between the modulus of elasticity for dispersing the stress to such an extent that the polarizing plate can return to the original state from deformation that occurred due to the stress applied and the hardness to prevent the surface from getting deformed due to the stress applied if the value (S/k) obtained by dividing the sum S representing the rigidity of the polarizing plate by the Knoop hardness k of the outer protective film is 200 or more but up to 450.

According to the invention, in order to allow the polarizing plate to have improved brittleness while obtaining a better pencil hardness on the polarizing plate surface, the sum S of the product of the modulus of elasticity and the cube of the thickness in each layer making up the polarizing plate is preferably 20,000-130,000 Pa·mm$^3$, and more preferably 30,000-110,000 Pa·mm$^3$.

For the same reasons as above, the value (S/k) obtained by dividing the sum S by the Knoop hardness k of the outer protective film is preferably 300 or more but up to 450.

Figure 1A:
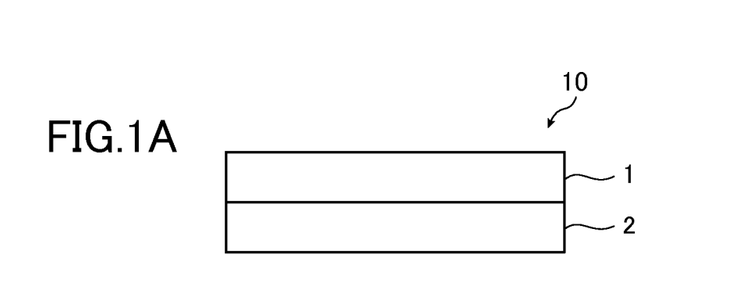
FIGS. 1A to 1C are cross-sectional schematic views each showing an example of an embodiment of a polarizing plate according to the invention.
Figure 1B:
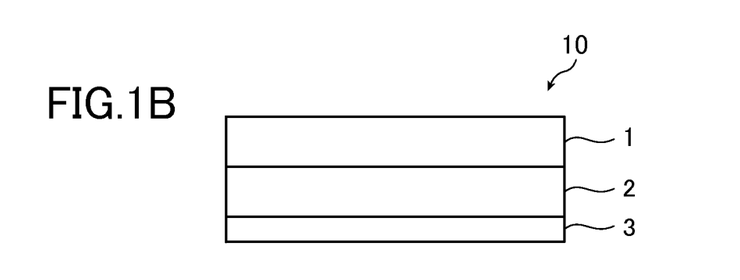
Figure 1C:
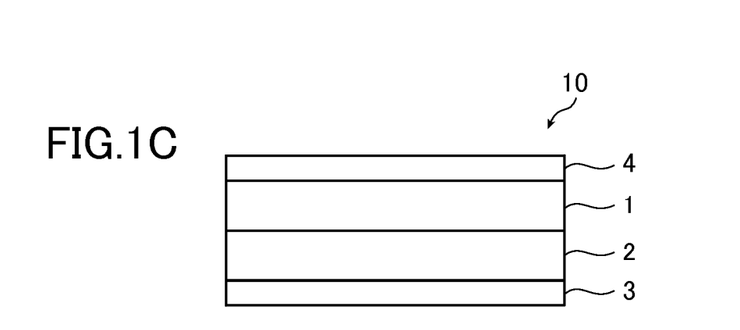

FIGS. 1A to 1C are cross-sectional views schematically showing examples of an embodiment of the polarizing plate according to the invention.

A polarizing plate 10 shown in FIG. 1A includes an outer protective film 1 and a polarizer 2.

The polarizing plate 10 shown in FIG. 1B includes the outer protective film 1, the polarizer 2 and an inner hard coat layer 3 formed in this order.

Moreover, the polarizing plate 10 shown in FIG. 1C includes an outer hard coat layer 4, the outer protective film 1, the polarizer 2 and the inner hard coat layer 3 formed in this order. The example shown in FIG. 10 includes the inner hard coat layer 3 and the outer hard coat layer 4 but may be an example only including the outer hard coat layer 4 in the polarizing plate of the invention.

Figure 2A:
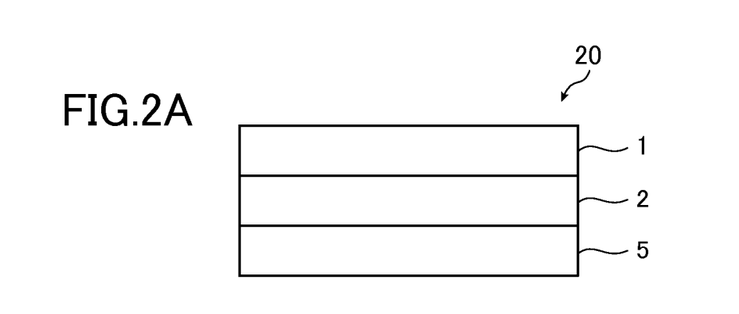
FIGS. 2A to 2C are cross-sectional schematic views each showing an example of another embodiment of the polarizing plate according to the invention.
Figure 2B:
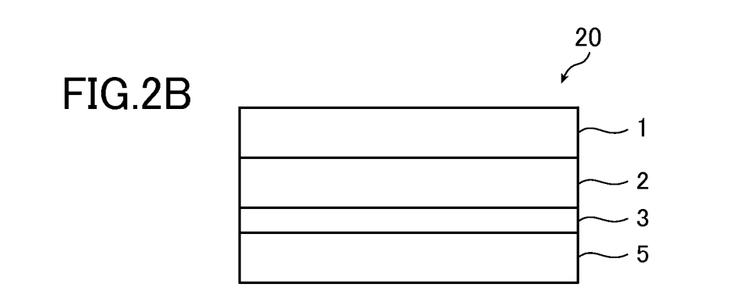
Figure 2C:
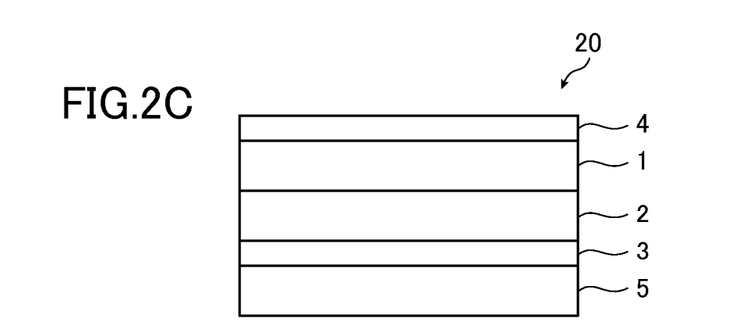

FIGS. 2A to 2C are cross-sectional views schematically showing examples of another embodiment of the polarizing plate according to the invention.

A polarizing plate 20 shown in FIG. 2A includes an outer protective film 1, a polarizer 2 and a pressure-sensitive adhesive layer 5 formed in this order.

The polarizing plate 20 shown in FIG. 2B includes the outer protective film 1, the polarizer 2, an inner hard coat layer 3 and the pressure-sensitive adhesive layer 5 formed in this order.

Moreover, the polarizing plate 20 shown in FIG. 2C includes an outer hard coat layer 4, the outer protective film 1, the polarizer 2, the inner hard coat layer 3 and the pressure-sensitive adhesive layer 5 formed in this order. The example shown in FIG. 2C includes the inner hard coat layer 3 and the outer hard coat layer 4 but may be an example only including the outer hard coat layer 4 in the polarizing plate of the invention.

The respective layers making up the polarizing plate of the invention are described below in detail.

[Outer Protective Film]

The outer protective film included in the polarizing plate of the invention is not particularly limited in its constituent material as long as a suitable material is selected in relation to other configuration so that the value (S/k) obtained by dividing the sum S of the product of the modulus of elasticity and the cube of the thickness in each layer making up the polarizing plate by the Knoop hardness k of the outer protective film is 200 or more but up to 450.

Specific examples of the outer protective film include thermoplastic resin films such as a cellulose acylate film, a (meth)acrylic resin film, a cycloolefin resin film, a polyester resin film, a polycarbonate resin film, and a polyolefin resin film.

It should be noted that (meth)acrylic resin is a concept containing both of methacrylic resin and acrylic resin and also includes an acrylate/methacrylate derivative and in particular an acrylate ester/methacrylate ester (co)polymer.

In addition to methacrylic resin and acrylic resin, the (meth) acrylic resin also includes a (meth)acrylic polymer having a ring structure in the main chain, examples thereof including a lactone ring-containing polymer, a succinic anhydride ring-containing polymer, a glutaric anhydride ring-containing polymer and a glutarimide ring-containing polymer.

Of these, a cellulose acylate film and a (meth)acrylic resin film are preferable in terms of workability and optical performance.

Various known cellulose acylate films may be suitably used as polymer films and specific examples of the cellulose acylate films that may be used include those described in JP 2012-076051 A.

Various known (meth)acrylic resin films may be used and specific examples of the (meth)acrylic resin films that may be suitably adopted include acrylic films described in paragraphs [0032] to [0063] of JP 2010-079175 A and lactone ring-containing polymers described in paragraphs [0017] to [0107] of JP 2009-98605 A.

<Thickness>

The outer protective film preferably has a thickness of 5 μm-30 μm and more preferably 10 μm-25 μm in terms of thickness reduction of the polarizing plate.

<Modulus of Elasticity>

In order to allow the polarizing plate to have improved brittleness while obtaining a better pencil hardness on the polarizing plate surface, the outer protective film preferably has a modulus of elasticity of 2.0 GPa-4.0 GPa, and more preferably 2.2 GPa-3.9 GPa.

In total 8 samples with a length in the measurement direction of 100 mm and a width of 10 mm are prepared by changing the orientation for cutting out in the measurement direction at intervals of 45°, the modulus of elasticity is calculated for each of the samples, and the minimum value is taken as the modulus of elasticity of the outer protective film. The modulus of elasticity of each sample was calculated as follows: Immediately after being allowed to stand in an environment of 25° C. and a relative humidity of 60% for 24 hours, each sample was stretched using a universal tensile testing machine "STM T50BP" manufactured by Toyo Baldwin Co., Ltd. in an atmosphere of 25° C. and a relative humidity of 60% under conditions of a chuck-to-chuck length of 100 mm and a tensile speed of 10%/min to measure the stress at 0.1% elongation and the stress at 0.5% elongation. The modulus of elasticity was calculated from the gradient thereof.

When the sample size does not satisfy 100 mm×10 mm, the modulus of elasticity can be determined as follows. A total of 8 samples, which have undergone humidity conditioning for 3 days at 25° C. and a relative humidity of 60%, are prepared by being cut at an azimuth varied by 45° in a measurement direction such that each sample becomes 35 mm long in the measurement direction and 5 mm wide. For each sample, a modulus of elasticity is calculated, and among the moduli of elasticity, the minimum value is taken as the modulus of elasticity of the outer protective film. In this case, the modulus of elasticity of each sample is calculated as follows. The environment of a measurement chamber is set to a relative humidity of 60%, and by using a dynamic viscoelasticity measuring apparatus (DVA-225 manufactured by IT Keisoku Seigyo K.K.) in a tensile mode, the modulus of elasticity is measured at 0° C. to 100° C., at a frequency of 1 Hz and a displacement amplitude of 0.02 mm, and in a state of increasing temperature at a rate of 2° C./min. The average of moduli of elasticity at a temperature of 20° C. to 30° C. is calculated and taken as the modulus of elasticity of the outer protective film.

<Knoop Hardness>

In order to allow the polarizing plate to have improved brittleness while obtaining a better pencil hardness on the polarizing plate surface, the Knoop hardness k of the outer protective film is preferably 130 N/mm$^2$-300 N/mm$^2$ and more preferably 140 N/mm$^2$-270 N/mm$^2$.

As for the Knoop hardness as used herein, measurement is made according to a Knoop hardness testing method as defined by JIS Z 2251:2009 using a Knoop indenter under conditions of an application time of 10 seconds and a maximum indentation load of 50 mN and the hardness was calculated from the relation of the contact area between the indenter and the sample as determined from the indentation depth with the maximum load.

[Polarizer]

The polarizer included in the polarizing plate of the invention is not particularly limited and a commonly used polarizer may be utilized.

Examples of the polarizer include a polarizer obtained by uniaxially stretching a hydrophilic polymer film (e.g., a polyvinyl alcohol film, a partially formalized polyvinyl alcohol film, a partially saponified ethylene/vinyl acetate copolymer film) after adsorption of a dichroic substance such as iodine or a dichroic dye; and polyene oriented films such as a film obtained by dehydration of polyvinyl alcohol and a film obtained by dehydrochlorination of polyvinyl chloride.

Of these, a polarizer including a polyvinyl alcohol film and a dichroic substance such as iodine is suitable.

<Thickness>

The thickness of the polarizer is not particularly limited and is preferably 2 μm-18 μm and more preferably 3 μm-16 μm in terms of thickness reduction of the polarizing plate.

<Modulus of Elasticity>

In order to allow the polarizing plate to have improved brittleness while obtaining a better pencil hardness on the polarizing plate surface, the modulus of elasticity of the polarizer is preferably 2 GPa-10 GPa, more preferably 3.5 GPa-10 GPa, and even more preferably 5 GPa-10 GPa.

The measurement method, measurement apparatus, and measurement conditions for the modulus of elasticity of the polarizer are the same as described in the measurement method for the modulus of elasticity of the aforementioned outer protective film.

[Hard Coat Layers]

As shown in FIGS. 1B and 1C, the polarizing plate of the invention preferably has the inner hard coat layer on the side of the polarizer (on the side on which a liquid crystal cell or an organic EL display panel is to be provided in an image display device to be described later) opposite to the side on which the outer protective film is provided.

Similarly, as shown in FIG. 1C, the polarizing plate of the invention preferably has the outer hard coat layer on the side of the outer protective film opposite to the side on which the polarizer is provided (on the visible side in an image display device to be described later).

For example, films described in paragraphs [0190] to [0196] of JP 2009-98658 A may be used for the hard coat layer.

The hard coat layer is preferably formed by a crosslinking reaction or a polymerization reaction of an ionizing radiation-curable compound.

For example, the hard coat layer can be formed by applying a coating composition containing an ionizing radiation-curable polyfunctional monomer or polyfunctional oligomer onto a protective layer to be described later to crosslink or polymerize the polyfunctional monomer or polyfunctional oligomer.

The functional group of the ionizing radiation-curable polyfunctional monomer or polyfunctional oligomer is preferably photopolymerizable, electron beam polymerizable or radiation polymerizable, and a photopolymerizable functional group is particularly preferable.

Examples of the photopolymerizable functional group include unsaturated polymerizable functional groups such as (meth)acryloyl group, vinyl group, styryl group and allyl group, and (meth)acryloyl group is particularly preferable.

In order to impart internal scattering properties, the hard coat layer may contain matte particles having an average particle size of 1.0 μm-10.0 μm and preferably 1.5 μm-7.0 μm, as exemplified by inorganic compound particles or resin particles.

<Thickness>

In order to allow the polarizing plate to have improved brittleness while obtaining a better pencil hardness on the polarizing plate surface, the inner hard coat layer and the outer hard coat layer each independently have a thickness of preferably up to 7 μm and more preferably 1 μm-5 μm.

<Modulus of Elasticity>

In order to allow the polarizing plate to have improved brittleness while obtaining a better pencil hardness on the polarizing plate surface, the inner hard coat layer and the outer hard coat layer each independently have a modulus of elasticity of preferably 1 GPa-7 GPa, more preferably 3 GPa-6.5 GPa, and even more preferably 3.5 GPa-5.5 GPa.

The modulus of elasticity of the hard coat layers is measured by the following method.

A laminate composed of a hard coat layer and a film whose physical properties are known is prepared, and the modulus of elasticity of the film (Es) and the modulus of elasticity of the laminate composed of the hard coat layer and the film (Ec) are determined from the initial gradients in both stress—strain curves obtained from the tensile strength tester; and the modulus of elasticity of the hard coat layer (Ef) is calculated using each expression of the internal stress shown below provided that the tensile test is carried out by applying a load to such a degree that the hard coat layer is not broken.

$$\sigma c(b+d) = \sigma f d + \sigma s b$$

$$Ec(b+d) = Efd + Esb$$

$$\therefore Ef = (Ec(b+d) - Esb)/d$$

σc: Internal stress of the laminate composed of the hard coat layer and the film
  σf: Internal stress of the hard coat layer
  σs: Internal stress of the film
  Ec: Modulus of elasticity of the laminate composed of the hard coat layer and the film
  Ef: Modulus of elasticity of the hard coat layer
  Es: Modulus of elasticity of the film
  b: Thickness of the film
  d: Thickness of the hard coat layer The measurement method, measurement apparatus, and measurement conditions for the modulus of elasticity of the hard coat layer are the same as described in the measurement method for the modulus of elasticity of the aforementioned outer protective film.

Further, a polarizer or an outer protective film for use in the polarizing plate of the invention may be used as the film whose physical properties are known.

[Pressure-Sensitive Adhesive Layer/Adhesive Layer]

As shown in FIGS. 2A to 2C, the polarizing plate of the invention may have a pressure-sensitive adhesive layer or an adhesive layer in advance in consideration of lamination with a liquid crystal cell or an organic EL display panel in an image display device to be described later.

The pressure-sensitive adhesive and the adhesive that may be used in the invention are not particularly limited and commonly used pressure-sensitive adhesives (e.g., an acrylic pressure-sensitive adhesive) and adhesives (e.g., a polyvinyl alcohol adhesive) can be utilized.

For example, pressure-sensitive adhesives described in paragraphs [0100] to [0115] of JP 2011-037140 A and paragraphs [0155] to [0171] of JP 2009-292870 A may be used for the pressure-sensitive adhesive and the adhesive that may be used in the invention.

[Image Display Device]

The image display device of the invention is one having the above-described polarizing plate of the invention.

Suitable examples of the image display device include a liquid crystal display device and an organic EL display device to be described later.

[Liquid Crystal Display Device]

A liquid crystal display device which is an example of the image display device of the invention is, for example, one having a liquid crystal cell and a pair of polarizing plates disposed so as to sandwich the liquid crystal cell therebetween, and an embodiment in which at least one of the polarizing plates in the pair is made up of the above-described polarizing plate of the invention is suitably illustrated.

In the practice of the invention, among the polarizing plates provided on both sides of the liquid crystal cell, the polarizing plate of the invention is preferably used as the polarizing plate on the visible side and the polarizing plates of the invention are more preferably used as the polarizing plates on the visible side and the backlight side.

<Liquid Crystal Cell>

The liquid crystal cell for use in the image display device (liquid crystal display device) of the invention is preferably of a VA mode, an OCB mode, an IPS mode or a TN mode but the cell mode is not limited thereto.

In a TN mode liquid crystal cell, rod-like liquid crystal molecules are oriented substantially horizontally when no voltage is applied and are further oriented in a twisted manner in a range of 60 to 120°. The TN mode liquid crystal cell is most often used in a color TFT liquid crystal display device and is mentioned in a large number of literatures.

In a VA mode liquid crystal cell, rod-like liquid crystal molecules are oriented substantially vertically when no voltage is applied. Exemplary VA mode liquid crystal cells include (1) a narrowly defined VA mode liquid crystal cell (described in JP 2-176625 A) in which rod-like liquid crystal molecules are oriented substantially vertically when no voltage is applied and are oriented substantially horizontally when a voltage is applied, (2) a multi-domain VA mode (MVA mode) liquid crystal cell for enlarging the viewing angle (SID97, Digest of Tech. Papers (Proceedings) 28 (1997) 845), (3) a liquid crystal cell in a mode (n-ASM mode) in which rod-like liquid crystal molecules are oriented substantially vertically when no voltage is applied and are oriented in twisted multi-domain alignment when a voltage is applied (Proceedings of Japanese Liquid Crystal Conference, 58-59 (1998)), and (4) a SURVIVAL mode liquid crystal cell (presented in LCD International 98). The liquid crystal cell may be of any of PVA (Patterned Vertical Alignment) type, Optical Alignment type and PSA (Polymer-Sustained Alignment) type. These modes are described in detail in JP 2006-215326 A and JP 2008-538819 A.

In an IPS mode liquid crystal cell, rod-like liquid crystal molecules are oriented substantially horizontally with respect to a substrate and application of an electric field parallel to the substrate surface causes the liquid crystal molecules to respond planarly. The IPS mode displays black when no electric field is applied and a pair of upper and lower polarizing plates have absorption axes which are orthogonal to each other. A method of improving the viewing angle by reducing light leakage during black display in an oblique direction using an optical compensation sheet is described in JP 10-54982 A, JP 11-202323 A, JP 9-292522 A, JP 11-133408 A, JP 11-305217 A, JP 10-307291 A and the like.

[Organic EL Display Device]

As the organic EL display device which is an example of the image display device of the invention, for example, an embodiment which includes, from the visible side, the polarizing plate of the invention, a plate having a λ/4 function (hereinafter referred to also as "λ/4 plate") and an organic EL display panel in this order is suitable.

The "plate having a λ/4 function" as used herein refers to a plate having the function of converting linearly-polarized light at a specific wavelength into circularly-polarized light (or circularly-polarized light into linearly-polarized light). Specific examples of an embodiment in which the λ/4 plate is of a single layer structure include a stretched polymer film, and a phase difference film in which an optically anisotropic layer having a λ/4 function is provided on a support. A specific example of an embodiment in which the λ/4 plate is of a multilayer structure includes a broadband λ/4 plate in which the λ/4 plate and a λ/2 plate are stuck on top of each other.

The organic EL display panel is a display panel configured using an organic EL device in which an organic light-emitting layer (organic electroluminescent layer) is sandwiched between electrodes (between a cathode and an anode).

The configuration of the organic EL display panel is not particularly limited but any known configuration is applied.

EXAMPLES

The present invention is described below in further detail based on examples. The materials, amounts used, ratios, treatments and treatment procedures illustrated in the examples below may be modified as appropriate as long as they do not depart from the scope and spirit of the present invention. Therefore, the scope of the present invention should not be construed as being limited to the following examples.

[Preparation of Outer Protective Films 1-8]

Respective ingredients were charged into a mixing tank so as to have compositions (parts by weight) shown in Table 1 below and stirred with heating to prepare cellulose acetate solutions (dopes 1-8).

TABLE 1

|  | Dope 1 | Dope 2 | Dope 3 | Dope 4 | Dope 5 | Dope 6 | Dope 7 | Dope 8 |
|---|---|---|---|---|---|---|---|---|
| Cellulose acetate | 100 | 100 | 100 | 100 | 100 | 100 | 100 | 100 |
| Ester oligomer | 30 | 40 | 30 | 40 | 50 | 60 | 0 | 0 |
| Triphenyl phosphate | 0 | 0 | 0 | 0 | 0 | 0 | 0 | 8 |
| Biphenyl diphenyl phosphate | 0 | 0 | 0 | 0 | 0 | 0 | 0 | 4 |
| Tinuvin 328 | 1.0 | 1.1 | 1.0 | 1.1 | 1.2 | 1.2 | 0.8 | 0.8 |
| Tinuvin 326 | 0.2 | 0.2 | 0.2 | 0.2 | 0.2 | 0.2 | 0.2 | 0.2 |
| Methylene chloride | 372 | 400 | 372 | 400 | 429 | 457 | 286 | 320 |
| Methanol | 56 | 60 | 56 | 60 | 64 | 68 | 43 | 48 |

The respective ingredients in Table 1 are shown below in detail.

Cellulose acetate: Cellulose acetate having a degree of acetyl substitution of 2.88

Ester oligomer: Ester oligomer A prepared by a method to be described later

Triphenyl phosphate: Plasticizer

Biphenyl diphenyl phosphate: Plasticizer

Tinuvin 328: UV absorber (BASF)

Tinuvin 326: UV absorber (BASF)

Methylene chloride: First solvent

Methanol: Second solvent (Ester Oligomer A)

The ester oligomer A is an aromatic ester oligomer containing a dicarboxylic acid-derived recurring unit and a diol-derived recurring unit at a ratio of one to one. When the molar ratio of an aliphatic dicarboxylic acid-derived recurring unit and the molar ratio of an aromatic dicarboxylic acid-derived recurring unit in the dicarboxylic acid-derived recurring unit were expressed by m and n, respectively, m and n were set to 0 and 10, respectively.

Phthalic acid was used as an aromatic dicarboxylic acid and ethylene glycol was used as a diol.

Both ends of the ester oligomer were sealed with acetyl groups. The ester oligomer had a hydroxyl value of 0 mg KOH/g and a number-average molecular weight of 1,000.

Then, each of the prepared cellulose acetate solutions (dopes 1-8) was cast using a band casting machine.

A web (film) obtained by flow casting was peeled from the band and was then dried at 100° C. for 20 minutes in a tenter for conveying the web with their both ends clipped, thereby obtaining a film with a thickness of 30 μm.

Thereafter, the resulting film was conveyed into a drying zone at a drying temperature of 120° C. and was then further stretched by 20% in a direction perpendicular to a conveyance direction using a tenter at 170° C., thereby preparing each of outer protective films 1 to 8 composed of a cellulose acylate film with a thickness of 25 μm.

The modulus of elasticity and the Knoop hardness of each of the prepared outer protective films 1 to 8 were measured by the above-described measurement methods. These results as well as the thickness of the outer protective films 1 to 8 are shown in Table 3 below.

It is to be noted that the modulus of elasticity of each of the prepared outer protective films 1 to 8 was measured in both cases that each sample has 100 mm long in the measurement direction and 10 mm wide and that each sample has 35 mm long in the measurement direction and 5 mm wide. As a result, the modulus of elasticity was almost the same in both cases.

[Preparation of Outer Protective Film 9]

The same method as for the preparation of the outer protective films 1 to 8 was repeated except that the prepared cellulose acetate solution (dope 5) was used, the thickness of the film before stretching was changed to 40 μm and the stretching ratio was changed to 40%, thereby preparing an outer protective film 9 composed of a cellulose acylate film with a thickness of 25 μm.

The modulus of elasticity and the Knoop hardness of the prepared outer protective film 9 were measured by the above-described measurement methods. These results as well as the thickness of the outer protective film 9 are shown in Table 3 below.

It is to be noted that the modulus of elasticity of the prepared outer protective film 9 was measured in both cases that each sample has 100 mm long in the measurement direction and 10 mm wide and that each sample has 35 mm long in the measurement direction and 5 mm wide. As a result, the modulus of elasticity was almost the same in both cases.

[Preparation of Outer Hard Coat Layer Coating Liquid (HC-1)]

Respective ingredients shown below were mixed in amounts shown below and the resulting mixture was filtered through a polypropylene filter with a pore size of 30 μm to prepare an outer hard coat layer coating liquid HC-1.

| | |
|---|---|
| PET-30 (binder) | 17 parts by weight |
| DPHA (binder) | 17 parts by weight |
| Toluene (solvent) | 63 parts by weight |
| Cyclohexanone (solvent) | 2 parts by weight |
| Irgacure 184 (polymerization initiator) | 1 part by weight |

The compounds used are shown below:

PET-30: Mixture of pentaerythritol triacrylate and pentaerythritol tetraacrylate (Nippon Kayaku Co., Ltd.)

DPHA: Mixture of dipentaerythritol hexaacrylate and dipentaerythritol pentaacrylate (Nippon Kayaku Co., Ltd.)

Irgacure 184: Polymerization initiator (BASF)

[Preparation of Inner Hard Coat Layer Coating Liquid (HC-2)]

Respective ingredients shown below were mixed in amounts shown below and the resulting mixture was filtered through a polypropylene filter with a pore size of 30 μm to prepare an inner hard coat layer coating liquid HC-2.

| | |
|---|---|
| A-TMMT (binder) | 100.0 parts by weight |
| Boronic acid monomer | 0.5 part by weight |
| Polymerization initiator | 3.0 parts by weight |
| Surfactant | 0.2 part by weight |
| Methyl ethyl ketone | 103.7 parts by weight |

The compounds used are shown below:

A-TMMT: A-TMMT (Shin-Nakamura Chemical Co., Ltd.) represented by the following formula:

[Chemical Formula 1]

A-TMMT

Boronic acid monomer: Compound 1 represented by the following formula:

[Chemical Formula 2]

Compound 1

Polymerization initiator: Irgacure 127 (BASF);

Surfactant: Copolymer with a weight-average molecular weight of 160,000 having recurring units shown in Table 2 at a content ratio (mol %) in Table 2. The weight-average molecular weight (Mw) is a polystyrene-equivalent measurement value obtained by GPC measurement.

TABLE 2

| | Molar ratio |
|---|---|
| (structure with (CF₂)H) | 90 |
| (structure with OH) | 10 |

[Preparation of Polarizer 1]

A polyvinyl alcohol (PVA) film with a thickness of 40 μm was immersed in pure water at 25° C. for 60 seconds for swelling treatment and was then stretched to 1.30 times. The resulting film was stained by immersion at 25° C. for 30 seconds in a stain solution containing 0.2 part by weight of iodine and 5 parts by weight of potassium iodide with respect to 100 parts by weight of water and was then stretched to 8 times the original length while immersing at 60° C. for 80 seconds in a crosslinking solution containing 4.3 parts by weight of boric acid and 3 parts by weight of potassium iodide with respect to 100 parts by weight of water. The stretched film was dried in an oven at 100° C. for 4 minutes to prepare a polarizer 1 with a thickness of 15 μm.

The modulus of elasticity of the polarizer 1 thus prepared was measured by the above-described measurement method. The results as well as the thickness of the polarizer 1 are shown in Table 3 below.

It is to be noted that the modulus of elasticity of the prepared polarizer 1 was measured in both cases that each sample has 100 mm long in the measurement direction and 10 mm wide and that each sample has 35 mm long in the measurement direction and 5 mm wide. As a result, the modulus of elasticity was almost the same in both cases.

[Preparation of Polarizer 2]

An isophthalic acid copolymerized polyethylene terephthalate obtained by copolymerizing 6 mol % of isophthalic acid was used as a resin substrate to form a PVA resin layer on the resin substrate by application. The resin substrate and the PVA resin layer were stretched together by a two-stage stretching step including aerial auxiliary stretching and stretching in boric acid solution, and stained by immersion at 25° C. for 30 seconds in a stain solution containing 0.2 part by weight of iodine and 5 parts by weight of potassium iodide with respect to 100 parts by weight of water. The resin substrate was then peeled to prepare a polarizer 2 with a thickness of 5 μm.

The modulus of elasticity of the polarizer 2 thus prepared was measured by the above-described measurement method. The results as well as the thickness of the polarizer 2 are shown in Table 3 below.

It is to be noted that the modulus of elasticity of the prepared polarizer 2 was measured in both cases that each sample has 100 mm long in the measurement direction and 10 mm wide and that each sample has 35 mm long in the measurement direction and 5 mm wide. As a result, the modulus of elasticity was almost the same in both cases.

[Preparation of Outer Hard Coat Layer-Bearing Outer Protective Films 1-9]

The outer hard coat layer coating liquid (HC-1) prepared as above was applied onto each of the prepared outer protective films 1 to 9 by die coating while setting the coating thickness to 5 μm.

Thereafter, the outer hard coat layer coating liquid was dried at 60° C. for 60 seconds and was then exposed to UV radiation at an illuminance of 400 mW/cm$^2$ and an exposure dose of 150 mJ/cm$^2$ using a 160 W/cm air-cooled metal halide lamp (Eye Graphics Co., Ltd.) through nitrogen purging (oxygen concentration: up to 0.1%) to cure the coating layer to thereby form an outer hard coat layer, thus preparing outer hard coat layer-bearing outer protective films 1 to 9. The outer hard coat layer had a thickness of 5 μm.

For obtaining the modulus of elasticity of the formed outer hard coat layer, the modulus of elasticity of the prepared outer hard coat layer-bearing outer protective films was calculated by the same method as used for the outer protective film prepared as above. Moreover, by using each of the aforementioned equations of internal stress and using the outer protective film prepared above as the film of which the physical properties had been identified, the modulus of elasticity (Ef) of the outer hard coat layer was calculated. The result is shown in the following Table 3.

Furthermore, from the prepared outer hard coat layer-bearing outer protective films, a total of 8 samples each having 35 mm long in a measurement direction and 5 mm wide were prepared by being cut at an azimuth varied by 45° in the measurement direction, and moduli of elasticity thereof were measured by the aforementioned method. As a result, the modulus of elasticity of the outer hard coat layer was almost the same as the result calculated as above.

Example 101

Preparation of Polarizing Plate 101

A laminate was prepared by bonding one surface of the above-described polarizer 1 to the outer protective film 1 side of the outer hard coat layer-bearing outer protective film 1 prepared as above via a polyvinyl alcohol adhesive layer.

The thus prepared laminate was dried in an oven at 60 to 90° C. for 5 minutes to prepare a polarizing plate 101.

Examples 102 to 108

Preparation of Polarizing Plates 102 to 108

The same method as for the polarizing plate 101 was repeated except that outer hard coat layer-bearing outer protective films using outer protective films of numbers (No.) shown in Table 3 and polarizers of numbers (No.) shown in Table 3 were used, thereby preparing polarizing plates 102 to 108.

Example 109

Preparation of Polarizing Plate 109

The inner hard coat layer coating liquid (HC-2) prepared as above was applied onto a surface of the polarizer 1 opposite to the side on which the outer protective film 1 is formed in the prepared polarizing plate 101, by die coating using a slot die as described in Example 1 of JP 2006-122889 A under a condition of a conveyance speed of 24 m/min and dried at 60° C. for 60 seconds.

Thereafter, the coating layer was further cured by exposure to UV radiation at an illuminance of 400 mW/cm$^2$ and an exposure dose of 390 mJ/cm$^2$ using a 160 W/cm air-cooled metal halide lamp (Eye Graphics Co., Ltd.) through nitrogen purging (oxygen concentration: about 0.1%), thereby preparing an inner hard coat layer-bearing polarizing plate 109 with a thickness after curing of 2 μm.

For obtaining the modulus of elasticity of the formed inner hard coat layer, the modulus of elasticity of the prepared polarizing plate 109 was calculated by the same method as used for the outer protective film prepared as above. Moreover, by using each of the aforementioned equations of internal stress and using the polarizing plate 101 prepared above as the film of which the physical properties had been identified, the modulus of elasticity (Ef) of the inner hard coat layer was calculated. The result is shown in the following Table 3.

Furthermore, from the prepared polarizing plate 109, a total of 8 samples each having 35 mm long in a measurement direction and 5 mm wide were prepared by being cut at an azimuth varied by 45° in the measurement direction, and moduli of elasticity thereof were measured by the aforementioned method. As a result, the modulus of elasticity of the inner hard coat layer was almost the same as the result calculated as above.

Examples 110 to 112

Preparation of Polarizing Plates 110 to 112

The same method as for the polarizing plate 109 was repeated except that outer hard coat layer-bearing outer protective films using outer protective films of numbers (No.) shown in Table 3 were used and the coating thickness was changed so as to have inner hard coat layer thicknesses shown in Table 3, thereby preparing polarizing plates 110 to 112.

The modulus of elasticity of the inner hard coat layer was measured by the same method as in Example 109. The result is shown in the following Table 3.

Comparative Examples 101 to 104

Preparation of Polarizing Plates 121 to 124

The same method as for the polarizing plate 101 was repeated except that outer hard coat layer-bearing outer protective films using outer protective films of numbers (No.) shown in Table 3 and a polarizer of a number (No.) shown in Table 3 were used, thereby preparing polarizing plates 121 to 124.

Comparative Example 105

Preparation of Polarizing Plate 125

The same method as for the polarizing plate 109 was repeated except that an outer hard coat layer-bearing outer protective film using an outer protective film of a number (No.) shown in Table 3 and a polarizer of a number (No.) shown in Table 3 were used and the coating thickness was changed so as to have an inner hard coat layer thickness shown in Table 3, thereby preparing a polarizing plate 125.

Comparative Example 106

Preparation of Polarizing Plate 126

A laminate was prepared by bonding a surface of the polarizer 1 opposite to the side on which the outer protective film 1 is formed in the polarizing plate 123 prepared in Comparative Example 103, to the outer protective film 8 prepared as above via a polyvinyl alcohol adhesive layer.

The thus prepared laminate was dried in an oven at 60 to 90° C. for 5 minutes to prepare a polarizing plate 126.

The sum S of the product of the modulus of elasticity and the cube of the thickness in each layer of each of the prepared polarizing plates, and the value obtained by dividing the sum S by the Knoop hardness k of each outer protective film were calculated and the results are shown in Table 3 below.

[Evaluation of Pencil Hardness]

In the present invention, the pencil hardness was evaluated according to JIS K 5400. Each of the prepared polarizing plates was stuck onto a glass plate using a commercially available pressure-sensitive adhesive SK2057 (Soken Chemical & Engineering Co., Ltd.) and the humidity was controlled at a temperature of 25° C. and a relative humidity of 60% for 24 hours. Thereafter, a testing pencil with a hardness of B as defined by JIS S 6006 was used to carry out a test twenty times (n=20) at a load of 500 g and the polarizing plates were evaluated according to the criteria as described below. The results are shown in Table 3 below.

<Criteria for Evaluating Hardness>

A: The number of scratches is 0 in the test carried out 20 times (acceptable).

B: The number of scratches is 1 or more but up to 12 in the test carried out 20 times (acceptable).

C: The number of scratches is 13 or more but up to 20 in the test carried out 20 times (unacceptable).

It should be noted that the testing direction with the pencil (scratching direction) was set to be perpendicular to the direction of the absorption axis of each polarizer.

TABLE 3

| | | Prepared polarizing plate No. | Outer hard coat layer | | Outer protective film | | | | Polarizer | | | Inner hard coat layer X | | | | Pencil hardness Evaluation B |
|---|---|---|---|---|---|---|---|---|---|---|---|---|---|---|---|---|
| | | | Thickness [μm] | Modulus of elasticity [GPa] | No. | Thickness [μm] | Modulus of elasticity [GPa] | knoop hardness k [N/mm²] | No. | Thickness [μm] | Modulus of elasticity [GPa] | Thickness [μm] | Modulus of elasticity [GPa] | Sum S | S/k | |
| EX | 101 | 101 | 5 | 4.0 | 1 | 25 | 3.4 | 230 | 1 | 15 | 7.0 | — | — | 77200 | 336 | A |
| EX | 102 | 102 | 5 | 4.0 | 2 | 25 | 2.5 | 160 | 1 | 15 | 7.4 | — | — | 64700 | 404 | A |
| EX | 103 | 103 | 5 | 4.0 | 1 | 25 | 3.4 | 230 | 2 | 5 | 7.1 | — | — | 54500 | 237 | B |
| EX | 104 | 104 | 5 | 4.0 | 2 | 25 | 2.5 | 160 | 2 | 5 | 7.1 | — | — | 40500 | 253 | B |
| EX | 105 | 105 | 5 | 4.0 | 3 | 25 | 3.0 | 210 | 1 | 15 | 7.4 | — | — | 72300 | 344 | A |
| EX | 106 | 106 | 5 | 4.0 | 3 | 25 | 3.0 | 210 | 2 | 5 | 7.1 | — | — | 48300 | 230 | B |
| EX | 107 | 107 | 5 | 4.0 | 4 | 25 | 3.9 | 253 | 1 | 15 | 6.6 | — | — | 83700 | 331 | A |
| EX | 108 | 108 | 5 | 4.0 | 5 | 25 | 2.2 | 140 | 1 | 15 | 6.9 | — | — | 58300 | 416 | A |
| EX | 109 | 109 | 5 | 4.0 | 1 | 25 | 3.4 | 230 | 1 | 15 | 7.0 | 2 | 4.0 | 77200 | 336 | A |
| EX | 110 | 110 | 5 | 4.0 | 2 | 25 | 2.5 | 160 | 1 | 15 | 7.4 | 2 | 4.0 | 64700 | 404 | A |
| EX | 111 | 111 | 5 | 4.0 | 1 | 25 | 3.4 | 230 | 1 | 15 | 7.0 | 5 | 4.0 | 77700 | 338 | A |
| EX | 112 | 112 | 5 | 4.0 | 2 | 25 | 2.5 | 160 | 1 | 15 | 7.4 | 5 | 4.0 | 65200 | 408 | A |
| CE | 101 | 121 | 5 | 4.0 | 6 | 25 | 1.7 | 80 | 1 | 15 | 7.3 | — | — | 51700 | 646 | C |
| CE | 102 | 122 | 5 | 4.0 | 7 | 25 | 4.2 | 184 | 1 | 15 | 7.5 | — | — | 91400 | 497 | C |
| CE | 103 | 123 | 5 | 4.0 | 8 | 25 | 5.0 | 200 | 1 | 15 | 7.4 | — | — | 103600 | 518 | C |
| CE | 104 | 124 | 5 | 4.0 | 9 | 25 | 3.0 | 145 | 1 | 15 | 7.3 | — | — | 72000 | 497 | C |
| CE | 105 | 125 | 5 | 4.0 | 8 | 25 | 5.0 | 200 | 2 | 5 | 7.4 | 10 | 5.0 | 84500 | 423 | C |
| CE | 106 | 126 | 5 | 4.0 | 8 | 25 | 5.0 | 200 | 1 | 15 | 7.4 | 25 | 5.0 | 181700 | 909 | A |

\* The fields of Inner hard coat layer in CE 106 represent the thickness and the modulus of elasticity of the inner protective film layer.

The results shown in Table 3 revealed that the surface pencil hardness is excellent when the sum S of the product of the modulus of elasticity and the cube of the thickness in each layer is up to 150,000 Pa·mm$^3$ and the value (S/k) obtained by dividing the sum S of the product of the modulus of elasticity and the cube of the thickness in each layer by the Knoop hardness k of the corresponding outer protective film is 200 or more but up to 450 (Examples 101 to 112).

It was particularly revealed that the surface pencil hardness is more excellent when the value (S/k) is 300 or more but up to 450. This shows that the effect is substantially equivalent to that of the polarizing plate in Comparative Example 106 in which the inner protective film is used and the thickness is not reduced, and is hence extremely excellent.

What is claimed is:

1. A polarizing plate comprising: an outer protective film; and a polarizer,
    wherein a sum S of a product of a modulus of elasticity and a cube of a thickness in each layer is up to 150,000 Pa·mm$^3$, and
    wherein a value obtained by dividing the sum S by a Knoop hardness k of the outer protective film is 200 or more but up to 450.

2. The polarizing plate according to claim 1, wherein the outer protective film has a thickness of 5 μm-30 μm.

3. The polarizing plate according to claim 1, wherein the outer protective film has a modulus of elasticity of 2.0 GPa-4.0 GPa.

4. The polarizing plate according to claim 2, wherein the outer protective film has a modulus of elasticity of 2.0 GPa-4.0 GPa.

5. The polarizing plate according to claim 1, wherein the outer protective film has a Knoop hardness k of 150 N/mm$^2$-300 N/mm$^2$.

6. The polarizing plate according to claim 2, wherein the outer protective film has a Knoop hardness k of 150 N/mm$^2$-300 N/mm$^2$.

7. The polarizing plate according to claim 3, wherein the outer protective film has a Knoop hardness k of 150 N/mm$^2$-300 N/mm$^2$.

8. The polarizing plate according to claim 4, wherein the outer protective film has a Knoop hardness k of 150 N/mm$^2$-300 N/mm$^2$.

9. The polarizing plate according to claim 1, wherein the polarizer has a thickness of 2 μm-18 μm.

10. The polarizing plate according to claim 2, wherein the polarizer has a thickness of 2 μm-18 μm.

11. The polarizing plate according to claim 3, wherein the polarizer has a thickness of 2 μm-18 μm.

12. The polarizing plate according to claim 4, wherein the polarizer has a thickness of 2 μm-18 μm.

13. The polarizing plate according to claim 5, wherein the polarizer has a thickness of 2 μm-18 μm.

14. The polarizing plate according to claim 6, wherein the polarizer has a thickness of 2 μm-18 μm.

15. The polarizing plate according to claim 7, wherein the polarizer has a thickness of 2 μm-18 μm.

16. The polarizing plate according to claim 8, wherein the polarizer has a thickness of 2 μm-18 μm.

17. The polarizing plate according to claim 1, wherein the polarizing plate comprises an inner hard coat layer with a thickness of up to 7 μm on a side of the polarizer opposite to a side on which the outer protective film is formed.

18. The polarizing plate according to claim 1, wherein the polarizing plate comprises an outer hard coat layer with a thickness of up to 7 μm on a side of the outer protective film opposite to a side on which the polarizer is formed.

19. An image display device comprising the polarizing plate according to claim 1.

* * * * *